US 9,499,125 B2

(12) United States Patent
Akay et al.

(10) Patent No.: US 9,499,125 B2
(45) Date of Patent: Nov. 22, 2016

(54) VEHICLE SYSTEM FOR ACTIVATING A VEHICLE COMPONENT TO PROVIDE VEHICLE ACCESS

(71) Applicants: Volkswagen Aktiengesellschaft, Wolfsburg (DE); Audi AG, Ingolstadt (DE)

(72) Inventors: Sinan Akay, Menlo Park, CA (US); Megan McClain, San Francisco, CA (US); Florian Rill, Braunschweig (DE); Tobias Steiner, Mountain View, CA (US)

(73) Assignees: Volkswagen Aktiengesellschaft, Wolfsburg (DE); Audi AG, Ingolstadt (DE)

( * ) Notice: Subject to any disclaimer, the term of this patent is extended or adjusted under 35 U.S.C. 154(b) by 165 days.

(21) Appl. No.: 14/065,996

(22) Filed: Oct. 29, 2013

(65) Prior Publication Data
US 2015/0120151 A1 Apr. 30, 2015

(51) Int. Cl.
*B60R 25/01* (2013.01)
*B60R 25/24* (2013.01)
*G07C 9/00* (2006.01)
*B60R 16/037* (2006.01)

(52) U.S. Cl.
CPC ............. *B60R 25/01* (2013.01); *B60R 25/24* (2013.01); *G07C 9/00111* (2013.01); *B60R 16/037* (2013.01); *B60R 2325/101* (2013.01); *B60R 2325/205* (2013.01)

(58) Field of Classification Search
CPC . B60R 25/01; B60R 25/24; B60R 2325/205; B60R 2325/101; G07C 9/00111
See application file for complete search history.

(56) References Cited

U.S. PATENT DOCUMENTS

| | | | | |
|---|---|---|---|---|
| 6,917,801 | B2* | 7/2005 | Witte et al. | 455/418 |
| 7,902,960 | B2* | 3/2011 | Tsuchimochi et al. | 340/5.71 |
| 8,717,429 | B2* | 5/2014 | Giraud | E05B 81/78 348/77 |
| 8,751,065 | B1* | 6/2014 | Kato | H04M 1/72533 340/426.13 |
| 8,847,731 | B2* | 9/2014 | Tieman | 340/5.62 |
| 8,907,770 | B2* | 12/2014 | Huffman | B60R 25/04 340/426.13 |
| 8,933,778 | B2* | 1/2015 | Birkel | B60R 25/24 340/5.54 |
| 8,947,202 | B2* | 2/2015 | Tucker et al. | 340/5.61 |
| 8,971,857 | B2* | 3/2015 | Nishidai | 455/411 |
| 9,002,536 | B2* | 4/2015 | Hatton | B60R 25/24 340/426.13 |
| 9,007,195 | B2* | 4/2015 | Ghabra | 340/426.16 |
| 9,162,648 | B1* | 10/2015 | Weng | B60R 25/24 |
| 2010/0233957 | A1* | 9/2010 | Dobosz | 455/41.1 |
| 2011/0102164 | A1 | 5/2011 | Ghabra | |

(Continued)

FOREIGN PATENT DOCUMENTS

EP  1 216 899 A1  6/2002
EP  1 867 536 A1  12/2007

(Continued)

*Primary Examiner* — Todd Melton
(74) *Attorney, Agent, or Firm* — Muncy, Geissler, Olds & Lowe, P.C.

(57) ABSTRACT

A vehicle system for activating at least one vehicle component to provide access to a vehicle. A first receiver is operative to obtain a wireless signal at least comprising first identification data of an electronic device; a memory device storing at least second identification data; at least a second receiver being operative to check the presence of a matching vehicle access key, and the at least second receiver being operative to check the presence of a matching vehicle access key if the first identification data match the at least second identification data.

21 Claims, 8 Drawing Sheets

(56) References Cited

U.S. PATENT DOCUMENTS

| | | |
|---|---|---|
| 2011/0257817 A1 | 10/2011 | Tieman |
| 2012/0007712 A1 | 1/2012 | Tung |
| 2012/0217764 A1* | 8/2012 | Ishiguro et al. ............ 296/1.07 |
| 2013/0099892 A1 | 4/2013 | Tucker et al. |
| 2013/0259232 A1* | 10/2013 | Petel .................. H04L 63/0492 380/270 |

FOREIGN PATENT DOCUMENTS

| | | |
|---|---|---|
| EP | 2 500 218 A1 | 9/2012 |
| FR | 2 981 823 A1 | 4/2013 |

* cited by examiner

VEHICLE SYSTEM FOR ACTIVATING A VEHICLE COMPONENT TO PROVIDE VEHICLE ACCESS

BACKGROUND OF THE INVENTION

Field of the Invention

The present disclosure relates to a vehicle system to provide access to a vehicle.

Description of the Background Art

Typical fuel engine vehicles are equipped with at least one battery to be able to start the combustion engine and to provide electrical energy to vehicle systems that are not completely powered off during the period that the vehicle is parked with the engine shut off. Examples of vehicle systems that need electrical power during parking are anti-theft alarm and the central locking system. With more and more electronic systems being implemented in the vehicle the amount of quiescent current drawn from the battery is therefore one important factor for the ability to restart the vehicle after a rest period of the vehicle.

The approach of the driver to the vehicle is usually not monitored by the vehicle because smart key systems, which can sense a vehicle key, consume too much electrical power to be monitoring for the key at all times. Instead, the user has to explicitly perform some action to wake up the vehicle system, such as touching the door handle. The door handle can include, for example, a capacitive sensor that returns a wake up signal for the central locking system upon touching the handle comprising the capacitive sensor. The central locking system can then check if an appropriate vehicle access key is in range. Only after being able to build up communication with the matching vehicle access key will the vehicle react to the required user action (e.g. for a keyless entry system, unlock the doors in case the handle was touched).

SUMMARY OF THE INVENTION

It is therefore an object of the present invention to provide a vehicle system for activating at least one vehicle component to grant access to a vehicle, wherein a first receiver is operative to obtain a wireless signal at least comprising first identification data from an electronic device. The first identification data is checked with identification data stored in the vehicle and if the checking results are positive, which means that the received identification data matches stored or generated identification data, a second receiver checks for a matching vehicle access key. If the second checking process returns positive results further actions are allowed for the vehicle.

In embodiments, further allowed actions can include that the wireless signal of the electronic device includes control commands for opening vehicle doors and windows, a vehicle trunk lid, an automatic tailgate, a fuel filler or an electrical charging port door release, an electrical charging plug release, a sunroof, or a convertible roof system. A vehicle system preference can also be transmitted to the car allowing for several advantageous passive as well as dynamic preference settings for the vehicle or for vehicle systems. In one embodiment the first receiver is a Bluetooth low energy receiver. A shut-off, sleep or standby mode of the second receiver can be used to save additional electrical energy. In one embodiment, the vehicle system additionally comprises a vehicle camera and an image recognition device to check for a person or a person's gesture in the image and initiating a vehicle system control command.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The detailed description particularly refers to the accompanying figures in which.

DETAILED DESCRIPTION

According to an embodiment, an illustrative passenger vehicle 600 comprises a vehicle system 100 for activating at least one vehicle component 150. A vehicle component 150 can be any component at the vehicle that can be activated by at least another component inside or outside the vehicle 600. The vehicle component 150 can be activated electrically either directly or indirectly through other components, for example by components operative to switch or regulate electronic current or voltage, such as but not limited to mechanical or solid-state relays, semiconductor switches (silicon controlled rectifiers, transistors, MOSFET-, CMOS devices, Insulated Gate Bipolar Transistors (IGBT) etc.). As an example, by receiving a specific wireless signal by a vehicle receiver the vehicle fuel filler door may be unlocked or mechanically opened by driving a motorized mechanism to open the fuel filler door. After receiving the signal there might be various electronic circuits, e.g. for decrypting the received signal, verifying the signal, interpreting the signal, transferring and providing a signal for driving the electric motor which is connected to the fuel filler door operable to open the door. This signal processing procedure may apply to any other vehicle component 150 as well.

Figure 1:
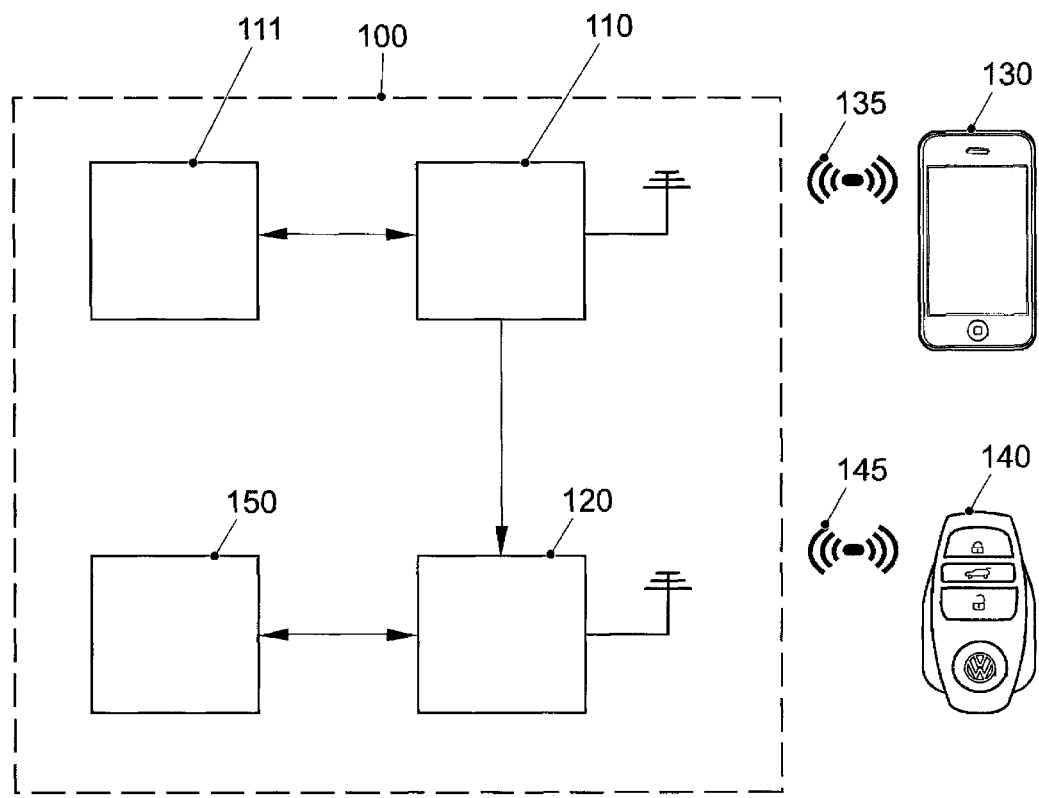
FIG. 1 provides a systematic overview of a vehicle system to provide access to a vehicle including two receivers to activate a vehicle function.

FIG. 1 provides a systematic overview of a vehicle system 100 including a first and second receiver 110, 120 to activate a vehicle component 150 or function. A vehicle user is approaching a vehicle 600 with at least one electronic device 130 and a matching vehicle access key 140. The electronic device 130 is able to send out a wireless signal 135 to communicate with the first receiver 110 if the electronic device 130 is in the reception range 601 of the first receiver 110. This signal can be a Bluetooth low energy signal. Bluetooth low energy was specifically designed to draw very low amounts of power and therefore these sending and receiving devices are very energy efficient. Especially when used in a vehicle 600 these devices can receive wireless signals 135 for a long time without the need to be shut down due to their quiescent current demand when the vehicle 600 is parked. When the user approaches the vehicle 600 the first receiver 110 obtains a wireless signal 135 from the electronic device 130, when the device 130 is in the reception range 601 of the first receiver 110.

The wireless signal 135 of the electronic device 130 comprises first identification data. In one embodiment the data comprises an identification code so that the vehicle system 100 can verify that a specific vehicle user carrying the electronic device 130 is in the reception range 601. The vehicle system 100 comprises a memory 111 or memory device in which second identification data is stored. The memory 111 is able to store more than one set of second identification data. This is beneficial in the case when more than one user uses the vehicle 600. By storing multiple sets of identification data the vehicle 600 is able to distinguish between the users and their preferences if the users each use a different set of first identification data. The identification data can also be dynamically generated and dynamically checked according to a predefined method to provide a higher level of safety when accessing the vehicle 600. The identification data can also be encrypted by the electronic device 130 and decrypted by the vehicle system 100.

If the first identification data match the at least second identification data stored in the memory 111 the first receiver 110 sends a control signal to the second receiver 120 to access a matching vehicle access key 140 by a wireless signal 145. If the second receiver 120 correctly identifies the vehicle key as a matching vehicle access key 140, at least one vehicle component 150 is activated or operated.

Vehicle components 150 include but are not limited to a central locking system, a vehicle door, a vehicle trunk lid, an automatic tailgate, a fuel filler door, an electrical charging port door release, an electrical charging plug release, a window opener, a sunroof, a convertible roof system, a vehicle infotainment system, a navigation system, a radio system, a climate control, a seat or mirror adjustment, a steering wheel adjustment, a pedal adjustment, an exterior or interior vehicle light, a driver assistance system or a vehicle camera.

A vehicle user can also activate at least one vehicle component 150 by directly sending the wireless signal 145 from the matching vehicle access key 140.

From keyless vehicle entry systems it is known (e.g. EP 1726753 B1) that upon touching a vehicle door handle this is detected by a capacitive sensor. The keyless entry system is then activated and a receiver checks for the presence of a matching vehicle access key 140.

With the suggested inventive vehicle system 100 the user interaction is advantageously more simplified. Not only can the central door locking system be activated at an earlier stage without the need of the user to touch a sensor but also the whole vehicle 600 or selected vehicle components 150 can be activated earlier. If the user does not have to touch a vehicle sensor to open the vehicle this is especially helpful if he is carrying something and returns to the vehicle. In this situation, the vehicle can additionally open the automatic tailgate.

Some vehicle infotainment systems require a noticeable boot up time to load and initiate software, sensors, receive positioning data (e.g. GPS data) or radio data (e.g. satellite radio signals), activate the fuel pump, preheat engine or start vehicle comfort systems etc. By being able to reduce these initialization times the vehicle user experience is greatly enhanced. Additionally, with the suggested vehicle system 100, the user can still use his standard vehicle key 140 to open the vehicle 600 as used to. The suggested vehicle system 100 is therefore advantageous if the user has forgotten his additionally electronic device 130, the batteries of the electronic device 130 are low, the electronic device 130 carried with the user is shut off either by intention or accidentally. Also, a temporary user can use the vehicle by the vehicle access key 140 as is common today.

The combination of a first and second identification step comprising different devices, such as electronic device 130 and vehicle access key 140, greatly enhance the possibilities of the user interacting with the vehicle 600. In one embodiment the electronic device 130 can exchange user specific settings with the vehicle 600. For example, if the user was listening to a specific radio station, a specific song or has looked up one or more navigation destination addresses, the electronic device 130 can submit the corresponding data to the vehicle infotainment, radio or navigation system. When entering the vehicle 600, the radio or infotainment system will continue to play his selected radio station or the current song the user was listening to. When entering the vehicle 600 the navigation system will present to the user the addresses he has recently searched for on the electronic device 130 or any other electronic device like a computer or computer tablet. The address is transmitted directly to the electronic device 130 or saved on a server, to which the electronic device 130, the computer or the vehicle 600 has access to.

In another embodiment the electronic device 130 is a telephone, for example a smart phone, on which an application is executed. In the application the user can define various user vehicle settings when he approaches the vehicle 600, e.g. open a specific door, turn on the radio, tune to a specific station, start the engine, open the sunroof, open the sunroof only if the sun is shining which may be detected by a vehicle light sensor or by receiving weather data and while the time is between 11:00 am and 04:00 pm. It is also possible to define geolocation based rules, for example, open the sunroof if the sun is shining and if the vehicle is at the home location or at a beach location.

In another embodiment, the user can select activating a microphone of the electronic device 130 when entering a predefined area around the vehicle 600, in which the first receiver 110 is able to communicate with the electronic device 130. The user can speak predefined commands, like "open the trunk and left sliding door", "turn off the radio", "tune radio to station KXYZ and open sunroof". These voice commands are interpreted by the electronic device 130 or by a server to which the electronic device 130 may send the voice commands. From the server the electronic device 130 receives the specific vehicle commands back, which the electronic device 130 subsequently sends to the vehicle 600. Another embodiment that requires a server connection would be "navigate to cheapest gas station within 5 miles". The server will search for gas stations and their gas prices within the 5 miles range and select the address of the cheapest gas station for the electronic device 130 to be sent as a destination instruction to the vehicle navigation system.

In another embodiment the electronic device 130 has saved the location and direction the parked vehicle 600 is pointing to. When the user approaches the vehicle 600 the electronic device 130 analyzes the direction the user is approaching the vehicle 600. If the user is approaching the vehicle 600 from the side, the side door or sliding door is opened. If the user approaches the vehicle 600 from the rear side, the trunk lid or automatic tailgate is opened.

There might be occasions in which the vehicle user might not want to open the trunk lid all the times he is approaching the vehicle 600 from the rear side. Therefore, in another embodiment, the vehicle 600 turns on a vehicle rear camera 620, when the vehicle user is approaching the vehicle 600 from the rear side. The vehicle camera 620 is able to detect a predefined gesture, e.g. lifting of a user's foot, swinging of a user's foot under the vehicle 600, or standing in a specific position for a predefined time to verify the intention of the user to open the vehicle trunk lid, the sliding door or automatic tailgate etc.

In another embodiment, a predefined motion gesture with the electronic device 130 in the reception range 601 of the first receiver 110 is interpreted as an instruction to activate at least one vehicle component 150. Some examples for motion gestures are the user is approaching the vehicle 600 from one side, stops and steps back; the user jumps; the user waves the electronic device 130. Any motion gesture can also be combined with a user's voice input to be recognized as a vehicle control command. For example, if the user stops and steps back at a door and says "Open", the motion gesture is recognized but the door will only be opened if the system recognizes a subsequent or parallel voice command input.

In another embodiment a wearable, second electronic device 820, e.g. a smart watch, worn by the user is equipped with at least one motion sensor or a microphone. The electronic device 130 is in communication with the second electronic device 820. The communication between the electronic device 130 and the second electronic device 820 can be done for example by using a Bluetooth, a Bluetooth low energy or a wireless LAN connection. A user motion or voice input is detected by the second electronic device 820 and transmitted to the electronic device 130. The user input is then processed in the electronic device 130 as described above.

In another embodiment, the voice or gesture input of the electronic device 130 or the second electronic device 820 is chosen according to what can be recognized best as a predefined gesture or voice input. This is specifically advantageous, if the user is wearing the electronic device 130 in a pocket or a bag. In that case, a voice input might be recognized best by the second electronic device 820 because the voice might be damped by clothes or the bag enclosure itself. In contrast, a motion gesture like stopping and stepping back might be best recognized by the electronic device 130 worn in the pocket. If the second electronic device 820 is a smart watch worn at the user's wrist, he might swing his arms when stopping and stepping back. Therefore a stopping gesture might not be recognized as well as with the electronic device 130.

In another embodiment a third wearable electronic device 830 comprises a camera. The third electronic device 830 is in communication with the electronic device 130. For example, the third electronic device 830 could be part of smart glasses 840, for example Google Glass™ wearable computing device. A smart watch could also include a camera. In the case where the camera of the third electronic device 830, or a subsequent image recognition processing step of an image taken by the third electronic device 830, recognizes the vehicle 600, e.g. by recognizing the license plate, the make, model and color etc., this can be counted as a user input and processed by the electronic device 130 as mentioned above. Furthermore, in the step of image processing and image recognition of the image taken by the camera 830 it can be detected from which direction the user is approaching the vehicle 600 without the additional use of at least one motion sensor. For example, if a license plate of the vehicle 600 is recognized in the image as well as the rear of the vehicle is recognized, e.g. the trunk lid is identified, then the trunk lid is opened when the user is approaching the vehicle 600. In another embodiment, if the vehicle 600 is recognized and the user is stopping in front of a vehicle door, the following images of the vehicle 600, including the corresponding door, taken by the camera of the third electronic device 830 are very similar. This is interpreted as the user's intention to open the specific vehicle door. The vehicle open command is then send by the electronic device 130 to the first receiver 110. The corresponding vehicle door is subsequently only opened if the second receiver 120 recognizes a matching vehicle access key 140.

In another embodiment, a user's hand or finger pointing gesture is detected by the camera 830 or a subsequent image or gesture recognition system. If the user points to a specific car door, window or trunk lid, the corresponding vehicle component 150 is activated to open the door, window or trunk lid. A sliding door can be opened with a corresponding sliding or waving motion. All of the above mentioned inputs can be combined or used in parallel; therefore a user can use any of the described input commands according to his situational preference. It is clear, that if the user is wearing a shopping bag in both hands a hand gesture input might be unsuitable.

The vehicle control commands can be reversed depending of the state or mode of the at least one vehicle component 150. For example, an open door, trunk or sunroof can be closed using the same input if in the open state before. It is also possible, that the user can also define different gestures for opening and closing.

Figure 2:
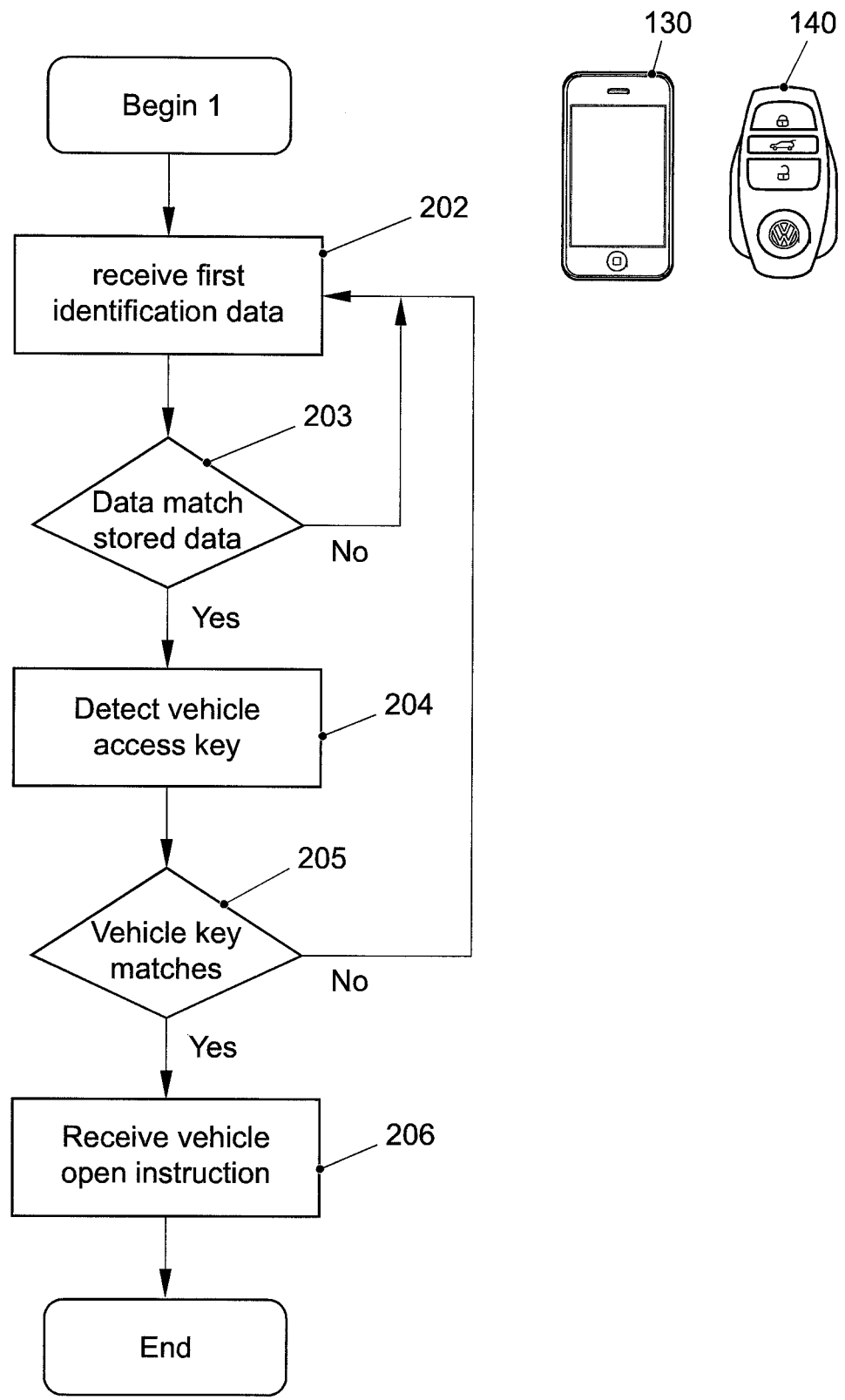
FIG. 2 is a flow diagram of a process to activate a vehicle component according to an embodiment of the present invention.

FIG. 2 is a flow diagram of a process to activate a vehicle component150 according to an embodiment of the present invention; the vehicle system 100 for activating at least one vehicle component 150 to provide access to a vehicle 600 comprises a first receiver 110. In step 202, a wireless signal 135, preferably a signal according to the Bluetooth low energy standard, is received by the first receiver 110. The wireless signal 135 contains first identification data send by the electronic device 130. These identification data can be encrypted and decrypted using encryption/decryption methods known in the prior art. Beforehand, the vehicle user is able to pair his at least one electronic device 130 with the vehicle 600. In the pairing procedure first identification data are exchanged.

Figure 3:
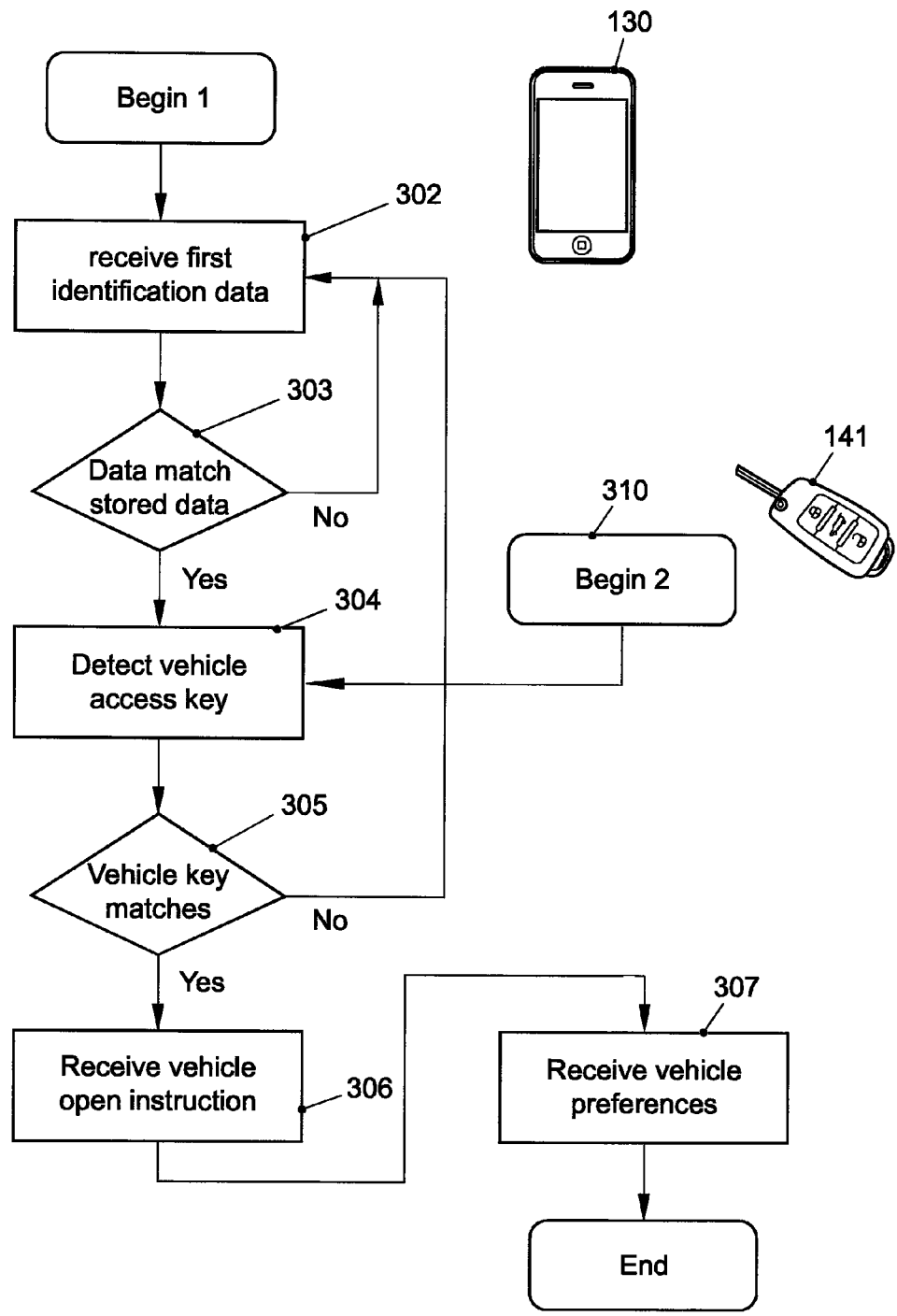
FIG. 3 is a flow diagram of a process to activate a vehicle component according to an embodiment of the present invention.

In step 203, the received first identification data is compared with information stored in a memory 111 of the vehicle 600. If the information does not match with the first identification data, the method returns to step 202, waiting to receive new first identification data from a wireless signal 135. Alternatively, the user can also open a vehicle by inserting a mechanical access key 141. This is illustrated in FIG. 3, beginning at step 310. As known in the prior art, there is a mechanical identification of the matching vehicle access key in a vehicle lock in step 305 and for starting the engine of the vehicle 600, an additional RFID chip signal is read from the mechanical key and verified during the starting procedure. The steps 202 to 206 in FIG. 2 correspond to steps 302 to 306 in FIG. 3.

If the received first identification data match the in-vehicle stored data, step 204 initiates the second receiver 120 to send out a signal or to receive a key signal from the vehicle access key 140. If the second receiver 120 detects a key signal 145, this signal is checked in step 205 whether it is a matching vehicle access key signal 145. This corresponds to checking a key mechanically in the lock, see FIG. 3. step 305, if the user is using a mechanical lock to open the vehicle, for example because the vehicle is not equipped with a keyless entry system.

If the vehicle access key 140 does not match, the method return to step 202 to wait for first identification data from an electronic device 130. For example, if the vehicle user has picked up no or the wrong vehicle access key 140, access to the vehicle 600 would not be granted although the first identification data match the second identification data stored in the vehicle 600. In one embodiment, the information about a missing or wrong vehicle access key 140 is fed back to the electronic device 130, which gives the user a haptical, visual or audio feedback.

If the vehicle access key 140 matches to the corresponding vehicle 600 a vehicle open instruction is received in step 206, FIG. 2 or step 306, FIG. 3. The user can now open a door and enter the vehicle 600.

FIG. 3 includes an additional step 307, in which the first receiver 110 receives vehicle preferences via the wireless signal 135 of the electronic device 130. These preferences may include data to open a specific door, turn on the radio, tune to a specific station, start the engine, set the heater or air conditioning to a predefined temperature, open the sunroof etc.

Also more complex preference settings are possible, for example to open the sunroof only if the sun is shining which may be detected by a vehicle light sensor or by receiving weather data and if the temperature is above a threshold and if the date is between April 1$^{st}$ and October 15$^{th}$ and if the actual time is between a predefined time interval, e.g. between 11:00 am and 4:00 pm etc.

It is also possible to define geolocation based preference rules, for example to open the sunroof only if the sun is shining, only if the vehicle is at the home location or at any predefined location or within a predefined area. In order to do that the vehicle 600 submits its position to the electronic device 130, when opening the vehicle. Alternatively, the electronic device 130 stores the position when leaving or locking the vehicle 600. In another embodiment, the user may also want to define that within an area around a shopping center he always wants the car to open the trunk when unlocking the vehicle 600. A corresponding voice command could be "Set preference to open trunk when approaching locked vehicle at Shopping Center XYZ."

Figure 4:
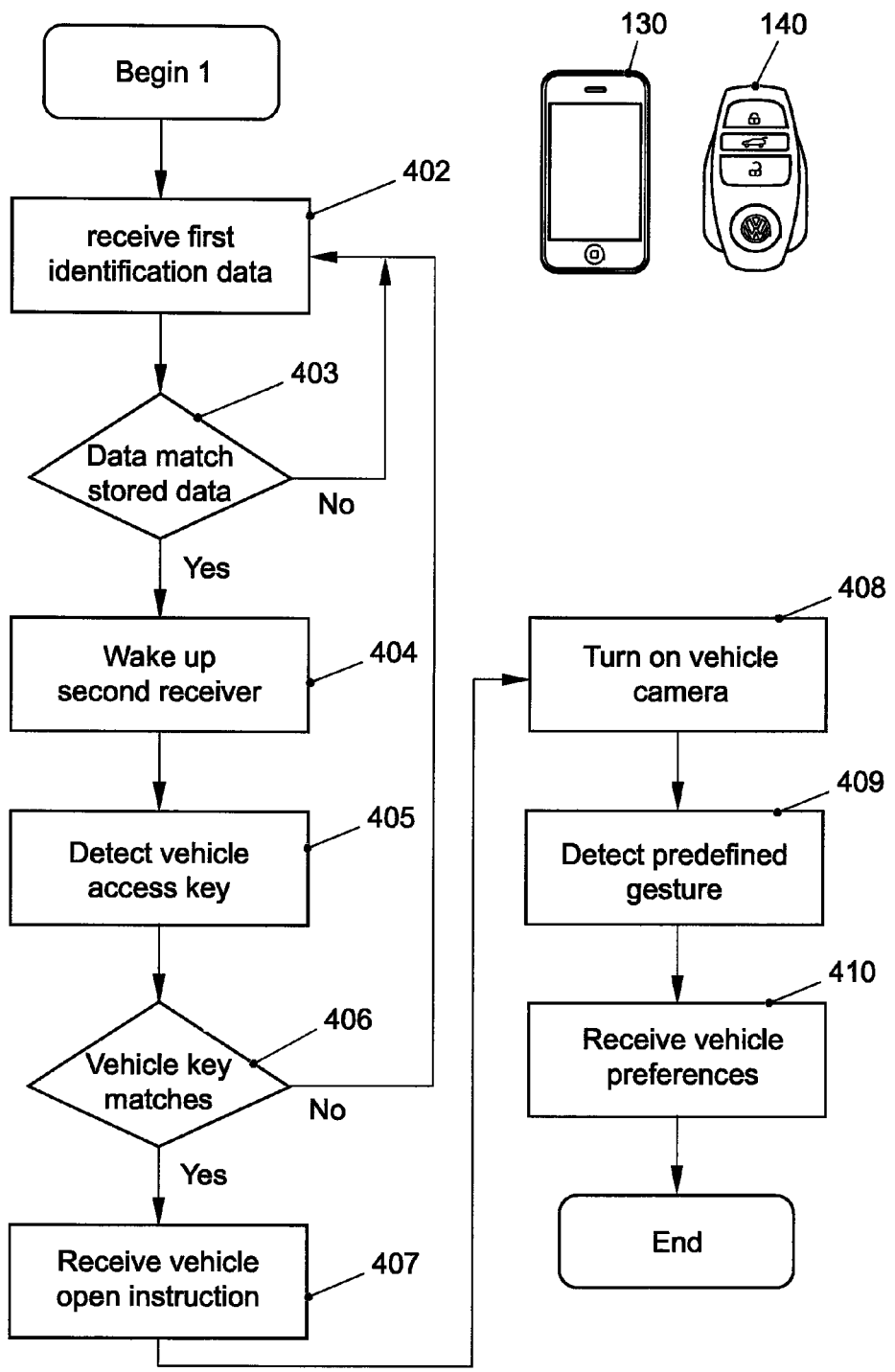
FIG. 4 is a flow diagram of a process to activate a vehicle component according to an embodiment of the present invention.

FIG. 4 shows a flow diagram of a process to activate a vehicle component 150 according to an embodiment of the present invention; Steps 402 and 403 correspond to steps 202 and 203 in FIG. 2. In this embodiment, the first receiver 110 is a Bluetooth low energy receiver, specifically designed to draw a very low amount of power. If the user leaves and locks the vehicle 600, the second receiver 120 is either completely shut off or switched to a low power mode. The second receiver 120 is not able to check for a matching vehicle access key 140 in this mode. Vehicles currently available on the market that have a remote vehicle access key check for a corresponding vehicles access key 140 periodically after being locked and therefore need a higher amount of power. There are also keyless entry systems that require the user to perform a specific action so that a receiver can check for a matching vehicle access key 140. In the embodiment shown in FIG. 4, the first receiver 110 wakes up the second receiver 120 after positively having checked the first identification data. This is done without the user having to perform a specific action when approaching the vehicle 600.

In step 405 it is checked if the user is carrying a matching vehicle access key 140. If this second authorization step is positively checked, the vehicle 600 receives instructions to activate at least one vehicle component 150 in step 407, for example to unlock the vehicle doors. Additionally, a rear view camera 620 is turned on in step 408. In step 409, the vehicle system 100 detects a specific gesture in at least one image or a video stream of the rear view camera 620 by an image recognition step (not shown). In case a predefined gesture is detected in step 409, the vehicle system 100 receives vehicle preferences by the first receiver 110 from the electronic device 130 in step 410. These preferences may include, for example, open instructions for automatic sliding doors or an automatic tailgate, the sunroof or the windows or a convertible roof.

Figure 5:
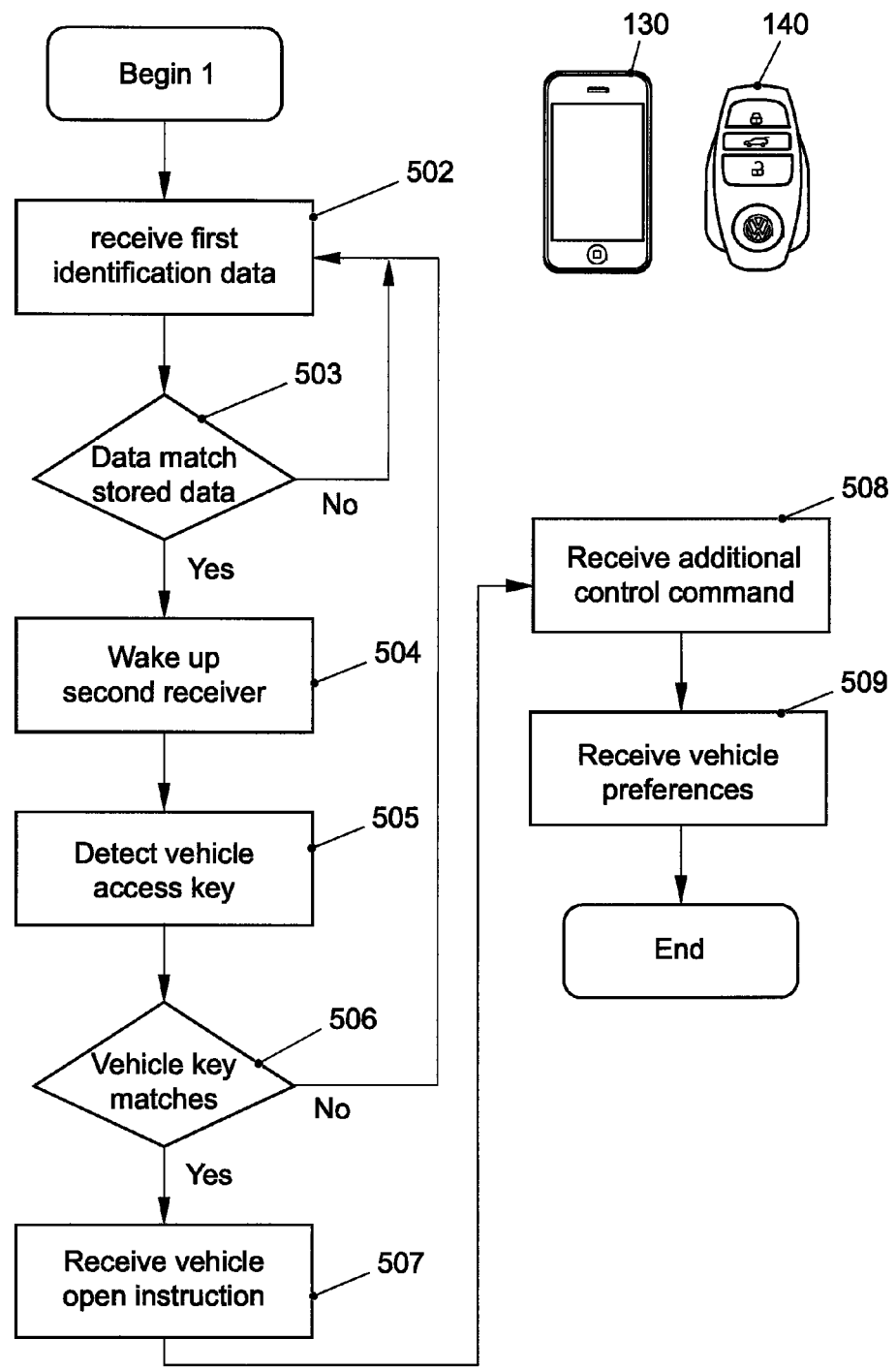
FIG. 5 is a flow diagram of a process to activate a vehicle component according to an embodiment of the present invention.

FIG. 5 is a flow diagram of a process to activate a vehicle component 150 according to an embodiment of the present invention; Method steps 502 to 507 correspond to steps 402 to 407 in FIG. 4. Additionally, the vehicle system 100 receives at least one additional control command in step 508. Since the preceding authorization steps for matching data of an electronic device 130 and for a matching vehicle access key 140 have been positively verified, it is now possible to send additional control commands for the vehicle 600 directly from the electronic device 130. For example, after the vehicle doors are unlocked, the electronic device 130 accepts voice commands by an integrated microphone (not shown). Alternatively, the microphone is integrated in the vehicle. These commands can be preset voice commands directly being recognized by the electronic device 130, e.g. open trunk, open window, open sunroof. A set of preset commands is especially preferable if the electronic device 130 has no data connection to a server. If the electronic device 130 is a smart phone with a data connection it can accept also additional voice commands entered in natural language. The inputs are sent to a server for interpretation and corresponding vehicle control commands are sent back to the smart phone which subsequently transmits these via a secure data channel to the vehicle 600. An example for additional control commands may be "Open convertible roof. Play song xyz from music library. Navigate to cheapest gas station within 3 miles and then to the nearest Volkswagen dealer.". In another embodiment the user can also request information from the vehicle 600 by voice command input: "Tell me the fuel level and the last oil change date".

Figure 6:
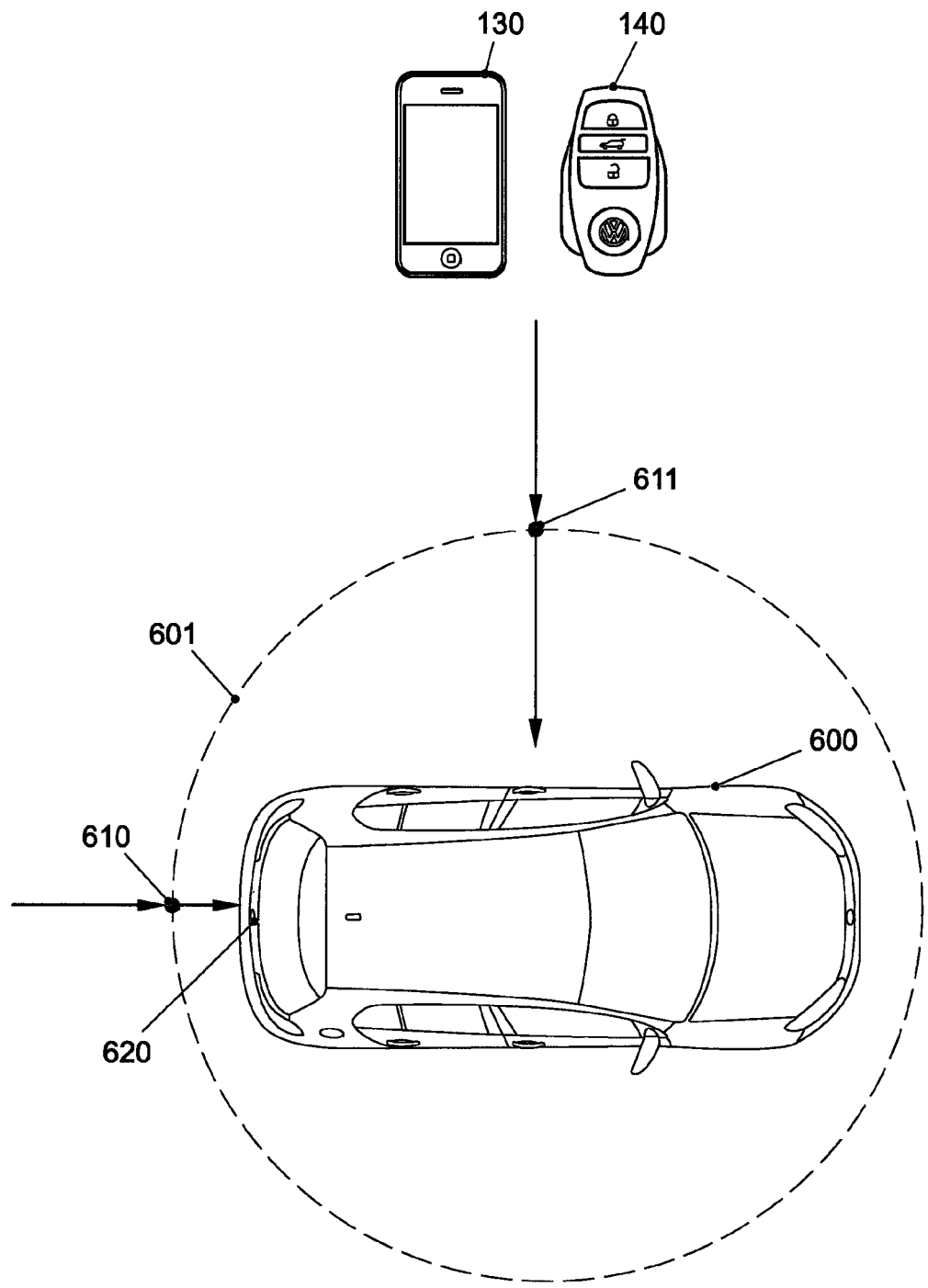
FIG. 6 schematically illustrates an approach of a vehicle user to his vehicle from different directions carrying an electronic device and a vehicle key according to an embodiment of the present invention.

FIG. 6 schematically illustrates an approach of a vehicle user to the vehicle 600 from different directions carrying an electronic device 130 as well as a vehicle access key 140 according to an embodiment of the present invention. In a first example, the vehicle user is approaching the vehicle 600 from the rear. A dashed circle 601 schematically represents the reception range 601 of the first receiver 110. At position 610 the vehicle user enters the reception range 601 of the first receiver 110. The first identification data of the electronic device 130 can now be received by the first receiver 110. If positively verified, the first receiver 110 wakes up the second receiver 120 and checks for a matching vehicle access key 140. If the matching vehicle access key 140 is detected, all vehicle doors are unlocked.

In another embodiment, the electronic device 130 stores the parking position and heading of the vehicle 600. In this example the electronic device 130 is a smartphone with a GPS- and motion or acceleration sensors. When the user now approaches the vehicle 600 the electronic device 130 or a computer executable program on a server can determine the current position of the smart phone and the direction the user is approaching the vehicle position. If the user approaches the vehicle from the rear and enters the reception range 601 at point 610, the smart phone and the first receiver 110 start communicating with each other. The smart phone is identified as a device that has been successfully paired to exchange first identification data with the vehicle 600. Since the user is approaching the vehicle 600 from the rear, a vehicle control command to activate a rear view camera 620 is sent to the vehicle 600. The user stops in front of the trunk lid and an image recognition within the vehicle 600 is able to identify a person in an image or a video stream taken by the rear view camera 620. The vehicle system 100 notices that the user is waiting, for example more than a predefined time, e.g. more than 2 seconds, in the rear of the vehicle 600 and subsequently opens the trunk lid and activates an automatic trunk lid opener.

In another example, the user enters the reception range 601 at a location 611 on the driver's side of the vehicle 600. The electronic device 130 or a remote server program analyses the GPS- or motion data of the electronic device 130 and compares that to the direction and position of the vehicle 600. It is determined, that the user is approaching the vehicle 600 from the driver's side and subsequently unlocks the door on the driver's side.

Figure 7:
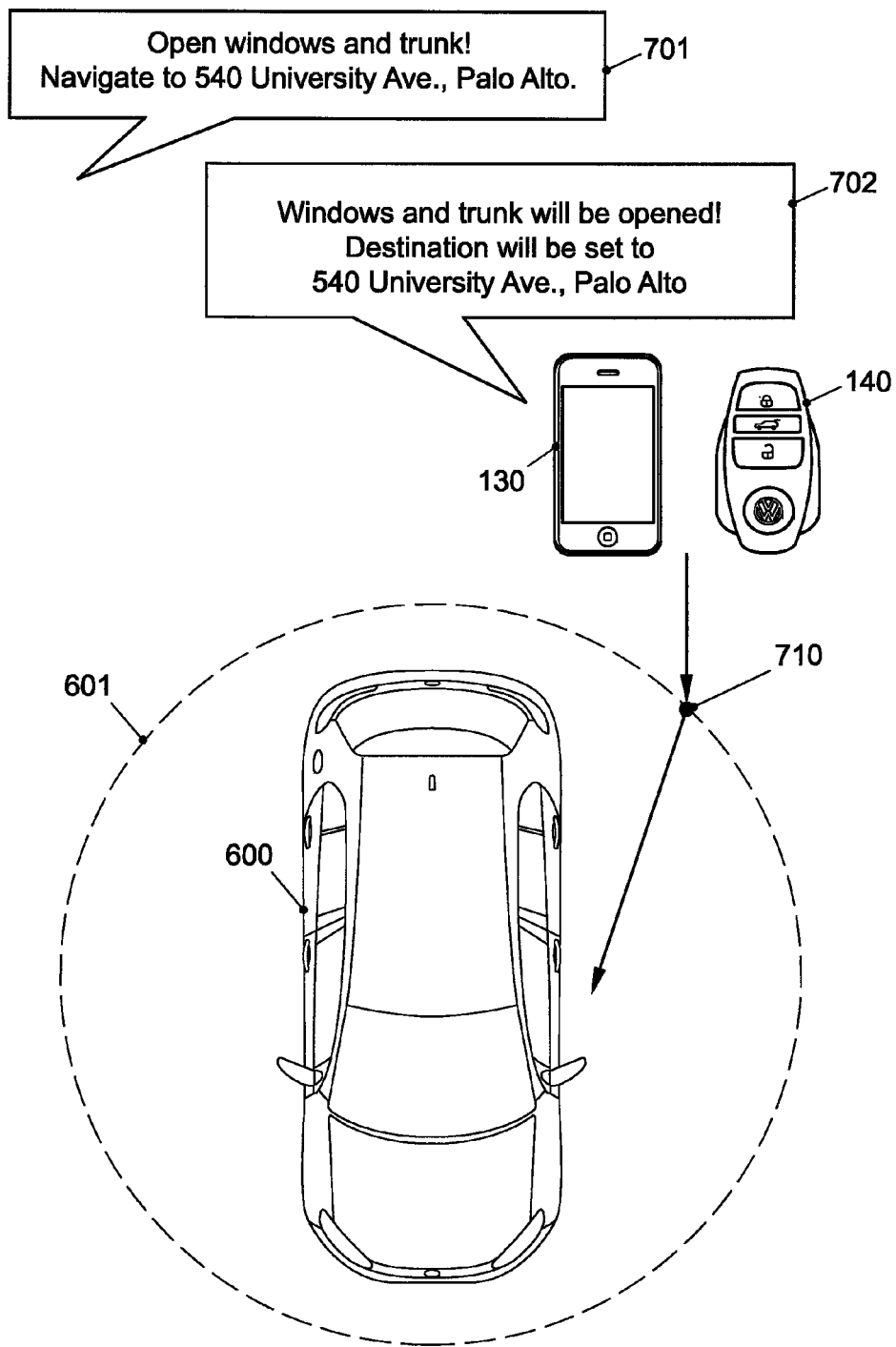
FIG. 7 schematically illustrates an approach of a vehicle user to his vehicle carrying an electronic device and a vehicle key using voice commands according to an embodiment of the present invention.

FIG. 7 schematically illustrates an approach of a vehicle user to the vehicle 600 carrying an electronic device 130 and a vehicle key 140 according to an embodiment of the present invention. In the illustrative embodiment the user is activating the voice recognition of the electronic device 130 before entering the reception range 601 of the first receiver 110. In step 701, he submits as a voice command "Open windows and trunk. Navigate to 540 University Ave., Palo Alto". In step 702 the electronic device 130 confirms the request with "Windows and trunk will be opened. Destination will be set to 540 University Ave., Palo Alto". At this time the electronic device 130 is not in communication with the vehicle 600 and stores the corresponding vehicle commands in the electronic device 130. When the user enters the reception range 601 of the first receiver 110 at point 710, the electronic device 130 exchanges first identification data with the first receiver 110. If the user also carries the vehicle access key 140, the vehicle system 100 accepts the vehicle commands previously entered and opens all windows and the trunk lid by activating an automatic trunk lid opener. The Navigation system is activated and the submitted address is set as the destination. In another embodiment, a vehicle interior or exterior microphone (not shown) is activated when the user enters the reception range 601. The vehicle user can enter voice commands directly into the vehicle's microphone, e.g. when standing in front of the vehicle trunk, he can say: "Open trunk lid." to open the trunk lid.

Figure 8:
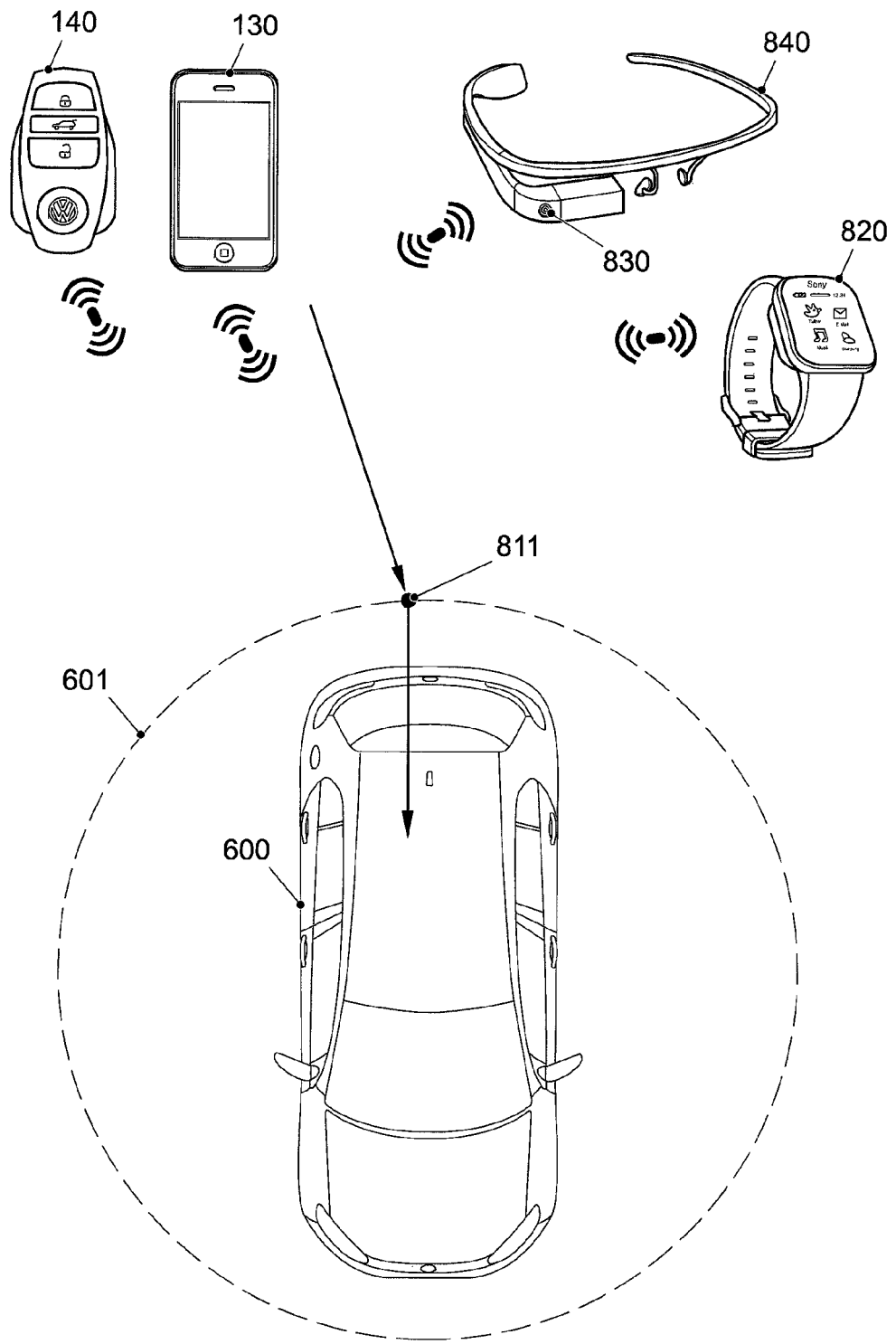
FIG. 8 schematically illustrates an exemplary second and third electronic device in communication with the electronic device according to an embodiment of the present invention.

FIG. 8 schematically illustrates an exemplary second and third electronic device 820, 830 in communication with the electronic device 130. In this embodiment, the user can pair a second and third electronic device 820, 830 to the electronic device 130. In this example, the second electronic device 820 is a smart watch with an integrated microphone (not shown) and a position and motion sensor (not shown). The third electronic device 830 is a wearable camera which is integrated into smart glasses 840. The second and third electronic device 820, 830 are in wireless communication with the electronic device 130, e.g. using a Bluetooth, a Bluetooth low energy or a Wi-Fi connection, and the devices can also be in wireless communication with each other. The paired devices are additional input devices for the electronic device 130. For example, the smart watch is an additional input device which the user wears at his wrist. The user can easily access the smart watch, including any input sensors of the watch by lifting his arm. He can, for example, record a voice command by the integrated microphone of the watch which is transmitted via a wireless signal to the electronic device 130. The voice command is then sent via a data connection to a server for interpretation of the voice command and for sending back vehicle control commands. These commands are sent from the electronic device 130 to the vehicle 600.

The user might also get an indication on the display of the smart watch if the electronic device 130, is in the reception area of the first receiver 110 of the vehicle 600. The indication might also be given haptically, e.g. a short mechanical surge, or via an audio-output of the watch when entering the reception area 601 of the vehicle 600 at point 811.

Of course, the number and designation of the devices mentioned above may be exchanged. For example, the electronic device 130 may be a smart watch and the second electronic device 820 may be a smart phone and the third electronic device may be the smart glasses. The electronic device 130 may be any portable electronic device with at least one wireless interface including, but not limited to a mobile phone, a smart watch, smart glasses, a tablet device, a key fob, an access card, a portable gaming device, a portable multimedia player or a portable music player.

Although certain illustrative embodiments have been described in detail above, variations and modifications exist within the scope and spirit of this disclosure as described and as defined in the claims included in this application.

What is claimed is:

1. A vehicle system for activating at least one vehicle component to provide access to a vehicle, the vehicle system comprising:
   a first receiver operative to obtain a wireless signal at least comprising first identification data of at least one mobile electronic device;
   a memory storing at least second identification data; and
   at least a second receiver operative to check a presence of a matching vehicle access key, the second receiver being operative to check the presence of a matching vehicle access key if the first identification data matches the at least second identification data, and
   wherein, if the check is successful, the vehicle system receives and executes at least two commands from the at least one mobile electronic device, wherein the commands operate the at least one vehicle component through a vehicle control system,
   wherein the at least one mobile device is connected with a server for generating at least one of the commands, and
   wherein the first receiver or the at least second receiver is operative to obtain a wireless signal comprising data for a vehicle system preference.

2. The vehicle system of claim 1, wherein the first receiver or the at least second receiver is operative to obtain a wireless signal comprising data for a vehicle open instruction for a vehicle door, a vehicle trunk lid, a fuel filler, electrical charging port door release, an electrical charging plug release, at least one window, a sunroof, or a convertible roof system.

3. The vehicle system of claim 1, wherein the vehicle system preference comprises data for a navigation system, a radio or infotainment system, a climate control, a seat adjustment, a steering wheel adjustment, or at least one driver assistance system.

4. The vehicle system of claim 1, wherein the first receiver is a Bluetooth low energy receiver.

5. The vehicle system of claim 1, wherein the at least second receiver is operable to be switched from a first to a second operation mode based on a signal from the first receiver.

6. The vehicle system of claim 5, wherein the first operation mode of the at least second receiver uses no power or less power compared to the second operation mode of this receiver.

7. A vehicle that includes the system of claim 1.

8. The vehicle system of claim 1, wherein the command is a preset action performed by the vehicle, including opening a trunk, turning on lights, turning on air conditioning or unlocking doors.

9. The vehicle system of claim 1, wherein the command is transmitted to the vehicle from the at least one mobile electronic device when the at least one mobile device enters a reception range of the vehicle system such that the at least one mobile electronic device communicates wirelessly with at least the first receiver.

10. The vehicle system of claim 1, wherein the vehicle system periodically checks the presence of the vehicle access key, if in communication with the at least one mobile electronic device.

11. The vehicle system of claim 1, wherein the matching vehicle access key is an electronic access device dedicated to the vehicle.

12. The vehicle system of claim 1, wherein an input command from a user is saved on the at least one mobile device and wirelessly transmitted when in range of the vehicle.

13. The vehicle system of claim 1, wherein the at least second identification data is stored in the vehicle system and corresponds to a specific mobile electronic device.

14. The vehicle system according to claim 1, wherein the data for the vehicle system preference comprises geolocation based preference rules.

15. A vehicle system for activating at least one vehicle component to provide access to a vehicle, the vehicle system comprising:
a first receiver operative to obtain a wireless signal at least comprising first identification data of at least one mobile electronic device;
a memory storing at least second identification data;
at least a second receiver operative to check a presence of a matching vehicle access key, the second receiver being operative to check the presence of a matching vehicle access key if the first identification data matches the at least second identification data;
a user camera on a wearable electronic device, the user camera capturing images of at least one vehicle and the wearable electronic device matching the at least one vehicle to a specific vehicle stored by a person;
a vehicle camera; and
an image recognition device;
wherein the vehicle system is operable to take at least one image or a video by the vehicle camera,
wherein the image recognition device is operative to check for a person or a predefined gesture of a person in the image or video, and
wherein, if the person or a predefined gesture of the person is recognized and a matching vehicle access key is received by the second receiver, the vehicle system initiates at least one vehicle control command in response to the predefined gesture or the person.

16. The vehicle system of claim 15, wherein the vehicle control command includes: open an automatic tailgate or vehicle door; turn on at least one exterior or interior light; or power on a vehicle radio or infotainment system.

17. The vehicle system of claim 15, wherein the vehicle control command is preset by a driver, and configurable to depend on environment variables including location, weather data, or a time of day.

18. A method of activating at least one vehicle component to provide access to a vehicle, the method comprising:
receiving a wireless signal containing first identification data by a first vehicle receiver from at least one mobile electronic device; and
comparing the first identification data to second identification data stored in a memory device of the vehicle,
wherein, if the first identification data matches the second identification data, a check is made for a presence of a matching vehicle access key in a reception range of at least a second vehicle receiver, wherein, if the check is successful, the at least one mobile electronic device transmits at least two instructions to the vehicle system,
wherein the instructions operate the at least one vehicle component through a vehicle control system,
wherein at least one of the instructions operates a sunroof, a radio, a vehicle infotainment system, a navigation system, an engine, a climate control, vehicle lights, mirror, seat or steering wheel adjustment, a drivers assistance system or a vehicle camera, and
wherein the first vehicle receiver receives additional data concerning at least one vehicle system preference.

19. The method of claim 18, wherein the first identification data is sent from a portable electronic device with a wireless interface.

20. The method of claim 19, wherein the portable electronic device is a mobile phone, a smart watch, or smart glasses.

21. The method of claim 18, wherein, if the check is successful, the vehicle automatically executes a preset command stored in the memory of the vehicle system.

* * * * *